3,170,909
CATIONIC AZO COMPOUNDS
Otto E. Neracher, Mount Vernon, N.Y., Abraham Cantor, Elkins Park, Pa., and William Schmidt, Flushing, N.Y., assignors to West Laboratories, Inc., Long Island City, N.Y., a corporation of New York
No Drawing. Filed June 22, 1962, Ser. No. 204,622
1 Claim. (Cl. 260—152)

This invention relates to a new class of azo compounds which are cationic in nature. More particularly, the invention relates to new compounds which may be referred to as 4(2-hydroxy-3-di-N,N-substituted amino-propoxy) azobenzenes including those having substituents in the azobenzene moiety and salts and quaternary ammonium derivatives thereof.

These new compounds have the following general formula:

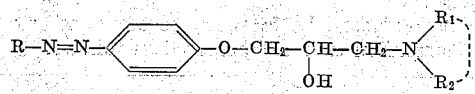

wherein R represents the phenyl radical, or a substituted phenyl radical, such as lower alkyl, lower alkoxy, and halogen substituted phenyl radicals and the naphthyl radical, and wherein —NR$_1$R$_2$ is a secondary amino radical either in open form or ring form. More particularly, the radical —NR$_1$R$_2$ may represent secondary amino radicals, such as N,N-lower di-alkyl amino, N,N-lower di-alkanol amino, piperidyl and morpholinyl radicals. The formulas for salts and quaternary ammonium derivatives need not be presented, as they can be readily visualized from the foregoing formula of the amines. It should be noted, however, that salts can be mineral acid salts, such as the hydrochloride, sulfate, or phosphate salts, as well as acetic acid or other biologically acceptable organic acid salts. The quaternizing agents can be considerably varied, and include alkyl halides, such as methyl iodide, ethyl bromide, and lauryl bromide; alkyl sulfates, such as dimethyl sulfate; α-chloroacetopheneone; benzyl halides, such as benzyl chloride, and halogen substituted benzyl halides such as p-chloro benzyl chloride, and 3,4 dichlorobenzyl chloride.

The products of this invention are solids, ranging in color from yellow-orange to dark brown, with the salt and quaternary forms generally being crystalline. The amines are soluble in most common organic solvents, but insoluble in water, while the salts and quaternary ammonium derivatives are soluble in most polar organic solvents, and are moderately soluble in water.

A large number of the products embraced by the general formula presented above have been found to have antimicrobial activity by conventional test methods. They also have toxic properties making them valuable as insecticidal, acaricidal, ovicidal, and nematocidal agents, as well as agents for combatting internal parasites, such as helminths in warm blooded animals. In addition, they are useful as dyestuffs and coloring agents for cellulosic materials, and for synthetic fibers and plastics, such as those of the polyacrylic type.

The new azo compounds may be prepared in various ways from readily available starting materials. The preferred method involves reaction of the appropriate phenyl-azophenol compound of the formula:

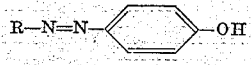

where R has the significance noted above, with an epihalohydrin under alkaline conditions to form a 4(2,3-epoxy propoxy) azobenzene compound of the formula:

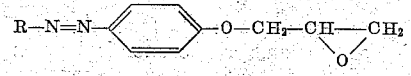

reacting this with a secondary amine at a temperature above 50° C. to form a tertiary amine alcohol of the formula:

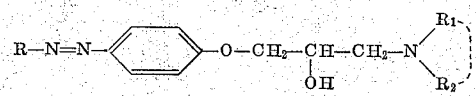

where the group

has the significance above noted, and reacting the same with the appropriate acid or quaternizing agent to form the desired salt or quaternary ammonium derivative.

The reaction of the phenylazophenol compound with epihalohydrin, suitably epichlorohydrin, is carried out using a molar excess, preferably about 2–1, of the epihalohydrin by heating the reactants together at about 90° C. in the presence of about a molar equivalent of alkali, such as aqueous sodium hydroxide. Heating is continued at about 90° C. until reaction is complete, generally about 2 hours. After cooling to room temperature, the precipitated product is washed with water and then taken up in a suitable solvent, such as acetone and purified by crystallization therefrom.

The resulting 4(2,3-epoxy-propoxy) azobenzene compound is then reacted with about a molar equivalent of the desired secondary amine. When the amine is a liquid, a mixture of the reactants is heated to about 120° C. for an extended period, suitably about 16 hours, with stirring. After cooling, the reaction mixture is dissolved in a suitable solvent, such as chloroform. The solvent solution is filtered, washed with water and then evaporated in vacuo to yield the tertiary amine product.

If a gaseous secondary amine, such as dimethyl amine is used, the reaction is carried out by dissolving the 4(2,3-epoxy-propoxy) azobenzene compound in a suitable solvent, such as benzene, and heating at reflux with vigorous stirring while slowly adding dimethylamine gas. The reaction requires about 8 hours, after which the product is precipitated as the amine hydrochloride. The salt can be reconverted to the free amine by reacting with concentrated aqueous sodium hydroxide, adding a non-polar solvent, such as benzene to dissolve the amine, separating and drying the benzene solution and evaporating in vacuo to obtain the solid amine compound.

Conversion of the tertiary amine to the acid salts is effected by simple reaction with hydrochloric, sulfuric, phosphoric, acetic, or other desired acid.

The amine hydrochloride is prepared by passing gaseous HCl through a benzene solution of the tertiary amine. The resulting precipitate is collected and dried at 50° C. under vacuum.

The amine salts of other acids mentioned above are prepared by mixing stoichiometric amounts of the tertiary amine and the desired acid at room temperature. The mixture is then diluted with a solvent suitable for extracting unreacted tertiary amine, i.e., ethyl acetate, and the resulting precipitate is collected and dried under vacuum.

When products in the form of quaternary ammonium salts are desired, the tertiary amine is reacted with approximately a molar equivalent of the quaternizing agent by heating for an extended period, suitably at 100° C. for about 16 hours. Unreacted amine is removed by extraction with a suitable solvent, such as ethyl acetate, and the precipitated quaternary ammonium salt can then be dried under vacuum. Purification, if desired, can be effected by dissolving in a polar solvent, such as ethanol, and evaporating to small volume to reprecipitate or crystallize the quaternary ammonium salt.

While the foregoing procedure for preparing the tertiary amines is considered preferable from the standpoint of availability of reactants and economics of the process, it will be understood that other procedures can be employed. For example, the secondary amine can be reacted first with the epihalohydrin, and the intermediate thus obtained, reacted with the phenylazophenol compound, or the sodium derivative thereof. Another example involves reacting the hoydroxy azobenzene with 1,3 dichloropropanol-2 in the presence of alkali and reacting the resulting compound with a secondary amine.

The following examples illustrate the present invention, but are not to be construed as limiting.

EXAMPLE I

*Preparation of 4(2-hydroxy-3-di-N,N-substituted aminopropoxy)azobenzenes of the formula:*

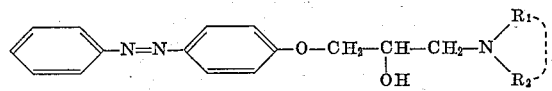

*and salts and quarternary ammonium derivatives thereof*

STEP 1

To a mixture of 253 g. of phenylazophenol and 235 g. of epichlorohydrin, there is added dropwise, with stirring and heating to 90° C., 151 g. of 33% sodium hydroxide solution. After addition of sodium hydroxide solution, stirring is continued for 2 hours at 90° C. The mixture is allowed to cool to room temperature and washed several times with distilled water. The crude material is recrystallized from acetone in good yield. The product, 4(2,3-epoxy-propoxy) azobenzene, is a reddish brown powder, M.P. 84° C. (91% epoxide by analysis).

STEP 2a.—REACTION WITH GASEOUS AMINE 28.5. of 4(2,3-epoxy-propoxy) azobenzene is dissolved in 150 ml. of benzene and heated to reflux. Dimethylamine gas is passed through the solution with vigorous stirring for 8 hours. The product is then precipitated as the amine hydrochloride salt by passing gaseous HCl through the benzene solution and filtered off. After washing the filtered residue with benzene, it is reacted with about 30% aqueous sodium hydroxide solution to reform the free tertiary amine which is extracted into benzene. The benzene solution is dried over anhydrous potassium carbonate and evaporated to dryness by heating in vacuo on the steam bath. The 4(2-hydroxy-3-dimethylamino-propoxy) azobenzene thus obtained is a yellow solid, M.P. 95° C. (100% tertiary amine by analysis).

STEP 2b.—REACTION WITH A LIQUID AMINE

About 26 g. of 4(2,3-epoxy-propoxy) azobenzene is heated with 8.5 g. of piperidine at 120° C. for 16 hours, with stirring. The mixture is cooled to room temperature, dissolved in 200 ml. of chloroform and filtered. The filtrate is washed with several times with distilled water. Chloroform is stripped from solution by heating in vacuo on the steam bath. The product thus obtained, 4(2-hydroxy-3-piperidyl-propoxy) azobenzene, is a brown solid, M.P. 113° C. (98% tertiary amine by analysis).

By the same procedure, but employing as reactants other secondary amines, there are prepared:

4(2-hydroxy - 3 - diethylamino-propoxy) azobenzene, an orange brown solid, M.P. 60° C.

4(2-hydroxy-3-diethanolamino-propoxy) azobenzene, a tan solid, M.P. 82° C., and

4(2-hydroxy-3-morpholinyl-propoxy) azobenzene, a light brown solid, M.P. 103° C.

STEP 3.—PREPARATION OF AMINE SALTS

Five grams of 4(2-hydroxy-3-dimethylamino-propoxy-azobenzene is dissolved in 50 ml. of benzene and precipitated as the amine hydrochloride by passing gaseous HCl through the solution. After filtering, washing the precipitate with benzene and drying in vacuo, the salt is recovered as a yellow solid, M.P. 193–194° C.

By the same procedure the 3-diethylamino compound is converted to the acetic acid salt, a yellow solid, M.P. 135° C.; and the 3-piperidyl compound is converted to the sulfuric acid salt, a light yellow solid, M.P. 248° C.

STEP 4.—PREPARATION OF QUATERNARY AMMONIUM SALTS

About 3.4 g. of 4(2-hydroxy-3-piperidyl-propoxy) azobenzene is heated with 1.4 g. of benzyl chloride at 100° C. for 16 hours. The mixture is then dispersed in 30 ml. of ethyl acetate, heated on the steam bath to dissolve any unreacted amine and filtered. The precipitate is then dried by heating to 50° C. under 5 mm. vacuum. The quaternary benzyl chloride salt thus obtained is a yellow powder, M.P. 191° C. (98% quaternary ammonium salt by analysis).

Following essentialy the same procedure, other quaternary ammonium salts are prepared as follows:

| Quaternizing Agent | Product color | M.P., °C. |
|---|---|---|
| p-Chlorobenzyl chloride | Yellow | 186 |
| Chloroacetophenone | Dark brown | 138 |
| Methyl iodide | do | 165 |
| Ethyl bromide | Tan | 126 |
| Lauryl bromide | Light brown | 143 |

In like manner quaternary ammonium salts of other tertiary amines are prepared as follows:

QUATERNARIES OF 3-DIMETHYLAMINE COMPOUND

| Quaternizing Agent | Product color | M.P., °C. |
|---|---|---|
| Benzyl chloride | Yellow | 204 |
| p-Chlorobenzyl chloride | do | 186 |
| 3,4-dichlorobenzyl chloride | do | 180 |
| Chloroacetophenone | Tan | 167 |

QUATERNARIES OF 3-DIETHYLAMINO COMPOUND

| Quaternizing Agent | Product color | M.P., °C. |
|---|---|---|
| Benzyl chloride | Yellow-orange | 78 |
| p-Chlorobenzyl chloride | Reddish-brown | 76 |
| Lauryl bromide | Light brown | 120 |
| Chloroacetophenone | Yellow | 173 |
| Methyl iodide | Brown | 145 |
| Ethyl bromide | Tan | 146 |
| 3.4-dichlorobenzyl chloride | Light yellow | 167 |

QUATERNARIES OF 3-DIETHANOLAMINE COMPOUND

| Quaternizing Agent | Product color | M.P., °C. |
|---|---|---|
| p-Chlorobenzyl chloride | Tan-yellow | 147 |
| Lauryl bromide | Yellow | 157 |
| Chloroacetophenone | Orange | 178 |
| 3,4-dichlorobenzyl chloride | Yellow | 150 |
| Ethyl bromide | Tan-yellow | 111 |

QUATERNARIES OF 3-MORPHOLINY COMPOUND

| Quaternizing Agent | Product color | M.P., °C. |
|---|---|---|
| Benzyl chloride | Tan-brown | 189 |
| p-Chlorobenzyl chloride | do | 188 |
| Lauryl bromide | Tan | 130 |
| Chloroacetophenone | Yellow | 180 |
| Methyl iodide | do | 169 |
| Ethyl bromide | Dark yellow | 175 |
| Dimethyl sulfate | Yellow | 134 |

EXAMPLE II

*Preparation of 4(2-hydroxy-3-di-N,N-substituted amino-propoxy)-4'-chloro-azobenzenes of the formula:*

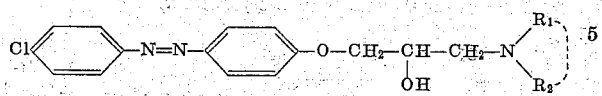

*and salts and quaternary ammonium derivatives thereof*

Following the procedure of Example I, Step 1, p-chlorophenyl azophenol is reacted with epichlorohydrin, and the product thus obtained is reacted as in Step 2a or 2b of Example I with selected secondary amines to form the corresponding tertiary amine of the above formula. The tertiary amines are then converted to acid salts as in Example I, Step 3, and quaternary ammonium salts as in Example I, Step 4. Data with respect to the products so prepared is tabulated below:

| Amine | Salt | Quaternizing Agent | Product Color | M.P.,° C. |
|---|---|---|---|---|
| Dimethyl | | | Orange | 95 |
| Do | HCl | | Yellow | 195 |
| Do | | Benzyl chloride | do | 205 |
| Do | | p-Chlorobenzyl chloride | do | 206 |
| Diethyl | | | Brown | 67 |
| Do | HCl | | Yellow | 177 |
| Do | | p-Chlorobenzyl chloride | Light brown | 121 |
| Do | | Lauryl bromide | do | 112 |
| Do | | Chloroacetophenone | Yellow | 176 |
| Do | | Methyl iodide | do | 166 |
| Do | | Ethyl bromide | do | 182 |
| Do | | Dimethyl sulfate | Tan | 102 |
| Do | | 3,4-dichlorobenzyl chloride | Yellow | 167 |
| Diethanol | | | Light brown | 101 |
| Do | | Benzyl chloride | Yellow | 187 |
| Do | | p-Chlorobenzyl chloride | Orange | |
| Do | | Lauryl bromide | Yellow | 186 |
| Do | | Methyl iodide | Brown | 160 |
| Do | | Chloroacetophenone | Yellow | 168 |
| Do | | Ethyl bromide | Light brown | 115 |
| Do | | Dimethyl sulfate | Yellow | 119 |
| Do | | 3,4-dichlorobenzyl chloride | do | 201 |
| Morpholine | | | Light brown | 125 |
| Do | H$_2$SO$_4$ | | Tan | 170 |
| Do | | Benzyl chloride | Brown | 184 |
| Do | | p-Chlorobenzyl chloride | do | 180 |
| Do | | Lauryl bromide | Yellow | 173 |
| Do | | Chloroacetophenone | Dark brown | 130 |
| Do | | Methyl iodide | Brown | 185 |
| Do | | Ethyl bromide | Light brown | 177 |
| Piperidine | | | Brown | 135 |
| Do | H$_3$PO$_4$ | | do | 201 |
| Do | | Benzyl chloride | do | 165 |
| Do | | p-Chlorobenzyl chloride | Orange-brown | 169 |
| Do | | Lauryl bromide | Light yellow | 180 |
| Do | | Chloroacetophenone | Brown | |
| Do | | Ethyl bromide | Light brown | 170 |

EXAMPLE III

*4(2-hydroxy-3-di-N,N-substituted amino-propoxy)-4'-methyl-azobenzenes of the formula:*

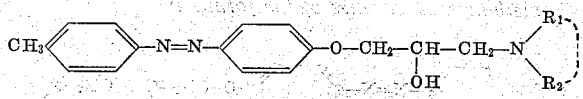

*and salts and quaternary ammonium derivatives thereof*

As in Example I, but starting with p-methylphenyl azophenol a number of tertiary amines and their salts and quaternary ammonium derivatives are prepared as indicated in the following tabulation:

| Amine | Salt | Quaternizing Agent | Product Color | M.P.,° C. |
|---|---|---|---|---|
| Diethyl | | | Dark brown | 67 |
| Do | H$_2$SO$_4$ | | Brown | |
| Do | | Methyl iodide | Yellow | 143 |
| Do | | Dimethyl sulfate | Orange-brown | 110 |
| Do | | Ethyl bromide | Yellow | 150 |
| Do | | Lauryl bromide | Light yellow | 139 |
| Do | | Benzyl chloride | Yellow | 145 |
| Do | | p-Chlorobenzyl chloride | Brown | 152 |
| Do | | Chloroacetophenone | Tan | 181 |
| Morpholine | | | Brown | 114 |
| Do | | Methyl iodide | do | 140 |
| Do | | Dimethyl sulfate | Yellow | 132 |
| Do | | Ethyl bromide | Light brown | 100 |
| Do | | Lauryl bromide | Yellow | 140 |
| Do | | Benzyl chloride | Light yellow | 154 |
| Do | | p-Chlorobenzyl chloride | Orange | 163 |
| Do | | Chloroacetophenone | Tan | 189 |
| Piperidine | | | Brown | 122 |
| Do | H$_3$PO$_4$ | | Tan | |
| Do | | Methyl iodide | do | 126 |
| Do | | Dimethyl sulfate | Brown | 106 |
| Do | | Ethyl bromide | Light brown | 121 |
| Do | | Lauryl bromide | Light yellow | 148 |
| Do | | Benzyl chloride | Tan | 176 |
| Do | | p-Chlorobenzyl chloride | Yellow | 167 |
| Do | | Chloroacetophenone | Brown | 134 |

EXAMPLE IV

4(2 - hydroxy-3-di-N,N-substituted amine-propoxy)-4'-methoxy-azobenzenes of the formula:

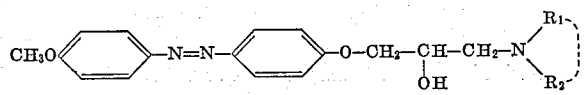

and salts and quaternary ammonium derivatives thereof

As in Example I, but starting with p-methoxyphenyl azophenol, a number of tertiary amines and their salts and quaternary ammonium derivatives are prepared as indicated in the following tabulation:

EXAMPLE V

4(2 - hydroxy-3-di-N,N-substituted amino-propoxy)-2',5'-dichloro-azobenzenes of the formula:

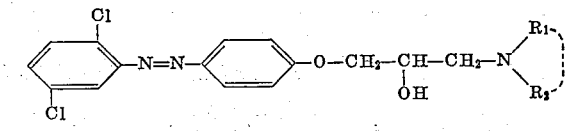

and salts and quaternary ammonium derivatives thereof

As in Example I, but starting with 2,5 dichlorophenyl azophenol, a number of tertiary amines and their salts and quaternary ammonium derivatives are prepared as indicated in the following tabulation:

| Amine | Salt | Quaternizing Agent | Product Color | M.P.,° C. |
|---|---|---|---|---|
| Diethyl | | | Brown | |
| Do | | | do | 90 |
| Do | | Methyl iodide | do | 133 |
| Do | | Ethyl bromide | do | 105 |
| Do | | Benzyl chloride | Dark brown | |
| Do | | p-Chlorobenzyl chloride | Tan | 168 |
| Do | | Chloroacetophenone | Dark brown | 109 |
| Diethanol | | | do | 120 |
| Do | HCl | | Brown | |
| Do | | Methyl iodide | Dark brown | 131 |
| Do | | Ethyl bromide | Brown | 88 |
| Do | | Lauryl bromide | Tan | 147 |
| Do | | Benzyl chloride | do | 133 |
| Do | | p-Chlorobenzyl chloride | Brown | 132 |
| Do | | Chloroacetophenone | Dark brown | 109 |
| Morpholine | | | do | 104 |
| Do | HOAc | | Brown | |
| Do | | Methyl iodide | Dark brown | 175 |
| Do | | Ethyl bromide | Brown | 109 |
| Do | | Lauryl bromide | Yellow | 171 |
| Do | | Benzyl chloride | Dark brown | |
| Do | | p-Chlorobenzyl chloride | Brown | 155 |
| Do | | Chloroacetophenone | Dark brown | 133 |
| Piperidine | | | do | 118 |
| Do | | Methyl iodide | do | 175 |
| Do | | Lauryl bromide | Tan | 171 |
| Do | | Benzyl chloride | Dark brown | |
| Do | | p-Chlorobenzyl chloride | Brown | 155 |
| Do | | Chloroacetophenone | Dark brown | 133 |

| Amine | Salt | Quaternizing Agent | Product Color | M.P.,° C. |
|---|---|---|---|---|
| Diethyl | | | Brown | |
| Do | HCl | | Light brown | |
| Do | | Benzyl chloride | do | 166 |
| Do | | p-Chlorobenzyl chloride | do | 161 |
| Do | | Lauryl bromide | do | 175 |
| Do | | Chloroacetophenone | Orange-brown | 172 |
| Do | | 3,4-Dichlorobenzyl chloride | Light brown | 174 |
| Diethanol | | | Brown | |
| Do | | Benzyl chloride | Dark brown | 78 |
| Do | | p-Chlorobenzyl chloride | do | 124 |
| Morpholine | | | Brown | |
| Do | HCl | | Light brown | 182 |
| Do | | Benzyl chloride | Yellow | 196 |
| Do | | p-Chlorobenzyl chloride | Reddish brown | 193 |
| Do | | Chloroacetophenone | Yellow | 194 |
| Do | | 3,4-dichlorobenzyl chloride | Orange-brown | 184 |
| Piperidine | | | Brown | |
| Do | | Benzyl chloride | Yellow | 202 |
| Do | | p-Chlorobenzyl chloride | do | 201 |
| Do | | Lauryl bromide | do | 167 |
| Do | | Chloroacetophenone | do | 204 |

EXAMPLE VI

4(2 - hydroxy-3-di-N,N-substituted amino-propoxy)-3',4'-dichloro azobenzenes of the formula:

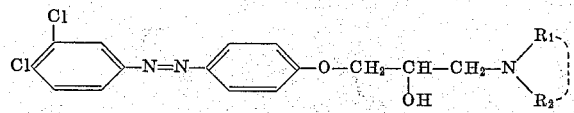

and salts and quaternary ammonium derivatives thereof

As in Example I, but starting with 3,4 dichlorophenyl azophenol, a number of tertiary amines and their salts and quaternary ammonium derivatives are prepared as indicated in the following tabulation:

| Amine | Salt | Quaternizing Agent | Product Color | M.P.,° C. |
|---|---|---|---|---|
| Diethyl | | | Brown | 92 |
| Do | | Benzyl chloride | Light brown | 183 |
| Do | | p-Chlorobenzyl chloride | Yellow | 163 |
| Do | | Chloroacetophenone | Orange-brown | 162 |
| Do | | Ethyl bromide | Tan | 161 |
| Do | | 3,4-dichlorobenzyl chloride | ___do___ | 172 |
| Diethanol | | | Brown | 94 |
| Do | H₃PO₄ | | ___do___ | 160 |
| Do | | Benzyl chloride | Reddish brown | 104 |
| Do | | p-Chlorobenzyl chloride | Yellow | 154 |
| Do | | 3,4-dichlorobenzyl chloride | ___do___ | 172 |
| Do | | Ethyl bromide | Tan | 162 |
| Morpholine | | | Brown | 108 |
| Do | HOAc | | Tan | 138 |
| Do | | Benzyl chloride | Brown | 174 |
| Do | | p-Chlorobenzyl chloride | Dark brown | 179 |
| Do | | Lauryl bromide | ___do___ | 130 |
| Do | | Chloroacetophenone | ___do___ | 130 |
| Do | | Methyl iodide | Yellow | 191 |
| Do | | Ethyl bromide | ___do___ | 128 |
| Piperidine | | | Brown | 116 |
| Do | HCl | | Yellow | 207 |
| Do | | Benzyl chloride | Brown | 182 |
| Do | | p-Chlorobezyl chloride | Yellow | 169 |
| Do | | Lauryl bromide | Brown | 124 |
| Do | | Chloroacetophenone | Dark brown | 115 |
| Do | | Methyl iodide | Brown | 161 |
| Do | | Ethyl bromide | Light brown | 120 |

EXAMPLE VII

4(2 - hydroxy-3-di-N,N-substituted amino-propoxy)-azophenyl naphthalenes of the formula:

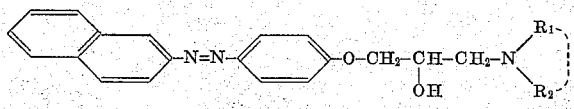

and salts and quaternary ammonium derivatives thereof

As in Example I, but starting with naphthyl azophenol, a number of tertiary amines and their salts and quaternary ammonium derivatives are prepared as indicated in the following tabulation:

| Amine | Salt | Quaternizing Agent | Product Color | M.P.,° C. |
|---|---|---|---|---|
| Morpholine | | | Dark yellow | 113 |
| Do | | Lauryl bromide | Yellow | 161 |
| Do | | Benzyl chloride | Light brown | 165 |
| Do | | p-Chlorobenzyl chloride | ___do___ | 159 |
| Do | | Chloroacetophenone | ___do___ | 130 |
| Piperidine | | | Brown | 127 |
| Do | HCl | | ___do___ | |
| Do | | Lauryl bromide | Tan | 180 |
| Do | | Benzyl chloride | Brown | 115 |
| Do | | p-Chlorobenzyl chloride | ___do___ | 124 |
| Do | | Chloroacetophenone | ___do___ | 125 |

Various changes and modifications in the procedures herein described in making the products above described and closely related products embraced by the general formula initially disclosed will occur to those skilled in the art, and to the extent that such changes and modifications are embraced by the appended claim, it is to be understood that they constitute part of the present invention.

We claim:

A cationic azo compound selected from the group consisting of (1) azo tertiary amines of the formula:

$$R-N=N-\langle\phantom{X}\rangle-O-CH_2-CH(OH)-CH_2-N(R_1)(R_2)$$

wherein R is selected from the group consisting of phenyl, lower alkyl phenyl, lower alkoxy phenyl, chloro substituted phenyl and naphthyl radicals, and

is a secondary amino radical selected from the group consisting of N,N-lower dialkylamino, N,N-lower dialkanol amino, piperidyl and morpholinyl radicals, (2) biologically acceptable salts of said amines with acids, and (3) quaternary ammonium derivatives of said amines.

References Cited in the file of this patent

UNITED STATES PATENTS

| 2,128,258 | Krzikalla et al. | Aug. 30, 1938 |
| 2,140,944 | Schirm | Dec. 20, 1958 |

FOREIGN PATENTS

| 337,198 | Switzerland | May 15, 1959 |
| 1,177,997 | France | Dec. 8, 1959 |